United States Patent [19]
Poole

[11] 3,936,611
[45] Feb. 3, 1976

[54] TIME COMPRESSION SCANNER

[75] Inventor: Margaret A. Poole, Wayland, Mass.

[73] Assignee: GTE Sylvania Incorporated, Stamford, Conn.

[22] Filed: Sept. 4, 1974

[21] Appl. No.: 502,933

[52] U.S. Cl. ... 179/15.55 T; 179/18 FG; 179/84 VF
[51] Int. Cl.$^2$.......................................... H04B 1/66
[58] Field of Search....... 179/15.55 T, 15 BY, 15 A, 179/84 VF, 1 SA, 1 SG, 1 SH, 1 SM, 1 MN, 18 FG

[56] References Cited
UNITED STATES PATENTS

| | | | |
|---|---|---|---|
| 3,223,783 | 12/1965 | Yamamoto | 179/84 VF X |
| 3,337,800 | 8/1967 | Halley | 179/15.55 T UX |
| 3,581,017 | 5/1971 | Stevens | 179/15 A |
| 3,715,509 | 2/1973 | Dawson | 179/15.55 T |
| 3,860,760 | 1/1975 | Rittenbach | 179/15.55 T |

*Primary Examiner*—Thomas W. Brown
*Attorney, Agent, or Firm*—David M. Keay; Elmer J. Nealon; Norman J. O'Malley

[57] ABSTRACT

Time compression scanner for monitoring telephone lines to detect supervisory tones. Eighty-eight lines are organized into eight groups of 11 lines each. The corresponding lines of each group are sampled simultaneously by a first arrangement of eight multiplexers. A second multiplexer repeatedly samples the eight samples from the first multiplexers. These analog samples are converted to digital samples and stored in a digital memory. The memory stores a set of samples pertaining to the incoming signals present on one line of each of the groups. When the first multiplexers each switch to the next line of each of the groups, the stored digital samples are read out of the memory. The samples are read out of the memory for each group in order, converted to analog signals, and passed through a low pass filter. The frequencies present in the resulting signal are speeded up by a factor of eight over the frequencies of any supervisory tones present in the incoming signal from which it was derived. These signal frequencies are passed through reject filters, comparator and limiter circuits, a bank of tone filters, and level detectors to check for each possible resultant frequency and to produce an indication of the presence or absence of each.

10 Claims, 14 Drawing Figures

FIG. 9

| READING SEQUENCE | | | RAM ADDRESS (OCTAL) |
|---|---|---|---|
| TERM | GROUP | SAMPLE | |
| 1 | 1 ... 1 ... 2 ... 3 ... 3 ... 8 ... 8 | 1 ... 2 ... 3 ... 128 ... 1 ... 128 ... 1 ... 128 ... 1 ... 128 | 0 ... 10 ... 20 ... 1770 ... 1771 ... 1772 ... 1777 |
| 2 | 1 ... 1 ... 2 ... 2 ... 3 ... 3 ... 8 ... 8 | 1 ... 2 ... 3 ... 128 ... 1 ... 128 ... 1 ... 128 ... 1 ... 128 | 0 ... 100 ... 200 ... 1707 ... 10 ... 1717 ... 20 ... 1727 ... 70 ... 1777 |

← 2.22 ms → (within each TERM block)
← 17.8 ms → (per TERM)

| SAMPLING & WRITING SEQUENCE | | | RAM ADDRESS (OCTAL) |
|---|---|---|---|
| TERM | GROUP | SAMPLE | |
| 1 | 1 ... 2 ... 3 ... 8 ... 1 ... 8 ... 1 ... 8 ... 1 ... 8 | 1 ... 1 ... 2 ... 2 ... 3 ... 3 ... 128 ... 128 | 0 ... 2 ... 7 ... 10 ... 17 ... 20 ... 27 ... 1770 ... 1777 |
| 2 | 1 ... 2 ... 3 ... 8 ... 1 ... 8 ... 1 ... 8 ... 1 ... 8 | 1 ... 1 ... 2 ... 2 ... 3 ... 3 ... 128 ... 128 | 0 ... 10 ... 20 ... 70 ... 100 ... 170 ... 200 ... 270 ... 1707 ... 1777 |
| 3 | 1 ... 2 ... 3 ... 8 ... 1 ... 8 ... 1 ... 8 ... 1 ... 8 | 1 ... 1 ... 2 ... 2 ... 3 ... 3 ... 128 ... 128 | 0 ... 100 ... 200 ... 700 ... 1000 ... 1700 ... 1 ... 701 ... 1077 ... 1777 |

← 139 μs → (within each TERM block)
← 17.8 ms → (per TERM)

ETC.

TIME COMPRESSION SCANNER

BACKGROUND OF THE INVENTION

This invention relates to apparatus for monitoring a plurality of input lines to detect the presence of analog signals. More particularly, it is concerned with scanners for detecting supervisory tones on telephone lines.

In a telephone exchange it is necessary to continuously monitor incoming lines to detect requests for service. Certain telephone systems employ supervisory tones of various predetermined frequencies for signaling for service. In a typical system an incoming line desiring service may have present thereon one or two tones of audio frequency indicating the nature of the service being requested. The function of continuously monitoring the incoming lines to detect the presence of these supervisory tones is performed by the scanner which recognizes the particular tones and the particular lines on which the tones are present.

It is common practice for the incoming lines to a scanner to be arranged in groups, for example, groups of 12 lines. The 12 lines of a group are connected to a multiplexer and the lines are sampled continuously, for example, for about 17 milliseconds of every 200 milliseconds. In a typical arrangement the output of the multiplexer is passed through a high pass filter and applied to a pair of band reject filters to separate high frequency tones and low frequency tones. The outputs of the band reject filters are applied to comparator and limiter circuitry. The resulting signals are applied to a bank of tone filters each of which passes one of the predetermined frequencies used in the system. The output of each tone filter is connected to a level detector which is set by a signal passing through its tone filter and produces a signal indicating that a particular tone is present on the line being sampled.

The scanner as briefly described requires complete duplication of all the scanning equipment for every group of 12 lines. The total amount of equipment employed increases proportionally with the number of groups of incoming lines in the system. Similarly, the space requirements, weight, and cost of a system also increases proportionally with the number of lines.

SUMMARY OF THE INVENTION

Time compression scanning apparatus in accordance with the present invention provides for monitoring a large number of incoming lines while considerably reducing the filtering and detection circuitry required. The apparatus detects the presence of signals of predetermined frequencies on any of a plurality of lines. The lines are arranged in a number of groups with a number of lines in each group.

The apparatus includes a first multiplexing means which repeatedly samples the lines of each group. During a line sampling period a corresponding one of the lines of each group is sampled simultaneously. The first multiplexing means has a number of output connections equal to the number of groups, and during each line sampling period each output connection has present thereon a sampled portion of the input signal from a different one of the groups. A second multiplexing means is coupled to the output connections of the first multiplexing means and repeatedly samples the output connections in sequence during each line sampling period. The second multiplexing means produces a multiplicity of analog samples of each of the sampled portions of the input signals at its output connection.

An analog-to-digital converting means is coupled to the output connection of the second multiplexing means and converts each of the analog samples in sequence to a digital sample. The digital samples are stored in a memory means. A memory readout means reads the digital samples associated with each of the groups of lines out of the memory means, all of the samples associated with a group being read out for each group in turn. The multiplicity of digital samples associated with a group is read out in the same sequence as the analog samples associated with that group were produced by the second multiplexing means.

A digital-to-analog converting means which is coupled to the memory means converts each digital sample to an analog pulse. The multiplicity of analog pulses associated with a group of lines is converted to an analog signal by a filter means. The signal frequencies present in the analog signal are equal to those predetermined frequencies present in the associated sample portion of the input signal times the number of groups. A detecting means determines the presence or absence of each of the signal frequencies in the analog signal and produces an indication thereof, thereby indicating the presence of absence of each of the predetermined frequencies in the associated sampled portion of the input signal. The apparatus also includes line address means for producing line identifying signals which designate the particular group and particular line of the group with which the indications are associated.

BRIEF DESCRIPTION OF THE DRAWINGS

Additional objects, featurs, and advantages of scanning apparatus in accordance with the present invention will be apparent from the following detailed discussion together with the accompanying drawings wherein:

FIG. 9 is a table which is useful in explaining the sequence of operations of the scanner.

DETAILED DESCRIPTION OF THE INVENTION

General

Figure 1:
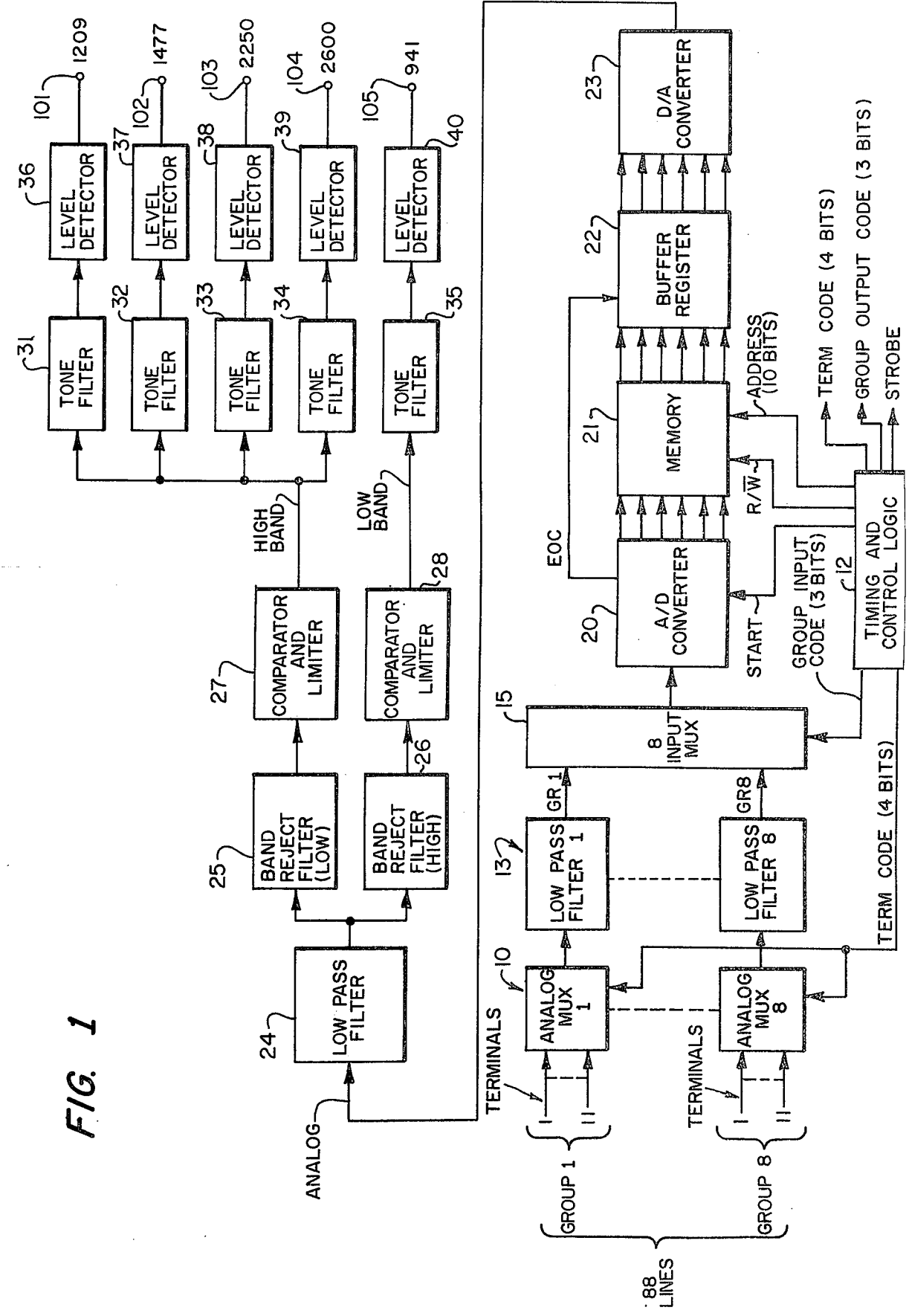
FIG. 1 is a block diagram of a time compression scanner in accordance with the present invention.

A time compression scanner in accordance with the present invention is illustrated in the block diagram of FIG. 1. For purposes of discussion of specific embodiment having particular parameters is described herein.

In the particular specific embodiment under discussion the supervisory tones employed to signal for service are four high frequency tones of 1,209 Hz, 1,477 Hz, 2,250 Hz, and 2,600 Hz, and a low frequency tone of 941 Hz. A signal for service present on a line consists of a single high frequency tone or a combination of the low frequency tone and a high frequency tone.

The scanner as illustrated in FIG. 1 monitors eighty-eight incoming lines which are arranged in eight groups, each group containing eleven lines. As illustrated in FIG. 1 the lines of each group are connected to the 11 input terminals of one of eight multiplexers 1–8, 10. Under control of TERM CODE signals from the timing and control logic 12, analog multiplexers 1–8 operate in parallel, each continuously sampling its eleven input terminals. Each sampled portion of an input signal from the analog multiplexers 1–8 is applied to an associated one of low pass filters 1–8, 13.

The sampled portions from the low pass filters 1–8 are applied in parallel to an 8-input multiplexer 15. The multiplexer 15 operates under control of GROUP INPUT CODE signals from the timing and control logic 12 to repeatedly sample each of the sampled portions in sequence. Each sampled portion is sampled 128 times.

Each analog sample from the eight-input multiplexer 15 is converted to a 6-bit digital sample by an analog-to-digital converter 20. The analog-to-digital converter 20 is controlled by a START signal from the timing and control logic 12. Under control of R/$\overline{W}$ and ADDRESS signals from the timing and control logic 12, the 6-bit samples are entered in a random access memory 21. By virtue of the sampling sequences of the analog multiplexers 1–8 and the eight-input multiplexer 15 the order in which the samples associated with the first terminal of each group are entered into the memory is the first sample from each of the eight groups in order, then the second sample from each group in order, until the 128th sample from each group is entered.

The digital samples associated with the first terminal of each group are read out of the memory 21 under control of the R/$\overline{W}$ and ADDRESS signals from the timing and control logic 12. All of the samples associated with each group are read out for each group in turn. That is, the 128 samples associated with the first group are read out in order, followed by the 128 samples associated with the second group, and so on. Samples are read out at the same rate as samples are entered. Each 6-bit sample is entered in a buffer register 22 and is applied to a digital-to-analog converter 23. The digital-to-analog converter converts each digital sample to an analog pulse. The analog pulses are applied to a low pass filter 24 to produce a smooth, continuous analog signal. By virtue of the time compression provided by the apparatus, the frequencies present in the analog signal from the filter 24 are 8 times the supervisory tone frequencies present on the incoming line with which the analog signal is associated.

The analog signal from the low pass filter 24 is applied to band reject filters 25 and 26. If one of the four high frequencies is present, it passes through a low band reject filter 25 to a comparator and limiter 27. If the low frequency is also present, it passes through a high band reject filter 26 to a comparator and limiter 28. The comparators insure that only signals above a predetermined threshold are accepted, and the limiters fix the amplitude of the signals.

Signals from the comparator and limiter 27 are applied to tone filters 31, 32, 33, and 34. The comparator and limiter 28 is connected to a tone filter 35. Each of the tone filters passes only a single frequency which is eight times one of the five supervisory tones. The high bandpass filters 31, 32, 33 and 34 pass 9,672 Hz, 11,866 Hz, 18,000 Hz, and 20,800 Hz, respectively, and the low bandpass filter 35 passes 7,528 Hz.

The outputs of the tone filters 31, 32, 33, 34 and 35 are applied to level detectors 36, 37, 38, 39 and 40, respectively. In response to a frequency of suitable amplitude being applied thereto, a level detector produces a steady state output signal at its output terminal. The presence of an output signal from one of level detectors 36, 37, 38, or 39 at output terminal 101, 102, 103, or 104 indicates the presence of a supervisory tone of 1,209 Hz, 1,477 Hz, 2,250 Hz, or 2,600 Hz, respectively, on the associated incoming line. Similarly, the presence of an output signal from level detector 40 at output terminal 105 indicates the presence of a supervisory tone of 941 Hz on the associated incoming line.

The timing and control logic 12 produces line identifying signals labelled GROUP OUTPUT CODE for identifying the particular group of incoming lines and TERM CODE for identifying the particular terminal of the group with which the output signals at output terminals 101, 102, 103, 104, and 105 are associated. A STROBE pulse is also produced by the timing and control logic 12 at a time which is subsequent to any possible delays in propagating data through the apparatus to the output terminals.

Timing Section

Figure 2:
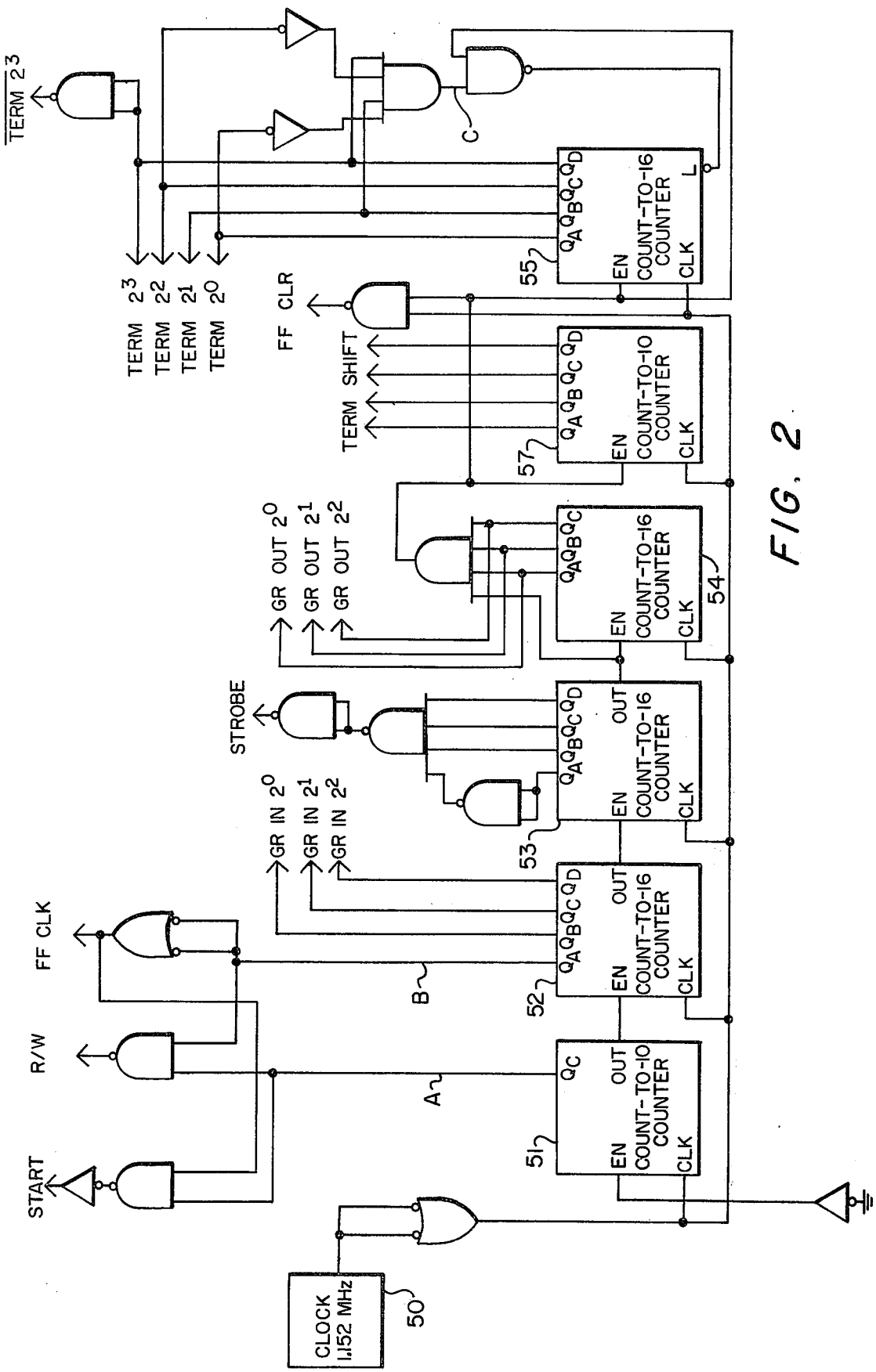
FIG. 2 is a logic diagram of the timing section of the scanner of FIG. 1.

The timing section of the timing and control logic is illustrated in the logic diagram of FIG. 2. Standard well-known symbols and notations are employed to designate various logic components. The timing and control signals for controlling the operation of the scanner are generated by the timing section. Certain of the signals produced in the timing section are shown in the timing diagrams of FIGS. 8A, 8B, and 8C. The timing train starts from a master oscillator 50 which produces squarewave clock pulses at the rate of 1.152 MHz. The squarewave pulses are applied to a series of counters including a count-to-10 counter 51, a count-to-16 counter 52, a second count-to-16 counter 53, a third count-to-16 counter 54, and a fourth count-to-16 counter 55 which is modified with appropriate logic to provide a count-to-11 counter.

Outputs labelled A and B (shown in FIG. 8A) are taken from stages in the count-to-10 counter 51 and the first count-to-16 counter 52 and combined to produce the START signal to the analog-to-digital converter 20 and the R/$\overline{W}$ signal to the memory 21. Output B is also used to produce FF CLK signal to the memory address control section. Signals labelled GR IN $2^0$, GR IN $2^1$, and GR IN $2^2$ are taken from the first count-to-16 counter 52 and applied to the eight-input multiplexer 15. These signals provide for operating portions of the scanner at the rate of 57.6 KHz establishing the basic data sampling period of 17.4 microseconds.

Figure 8:
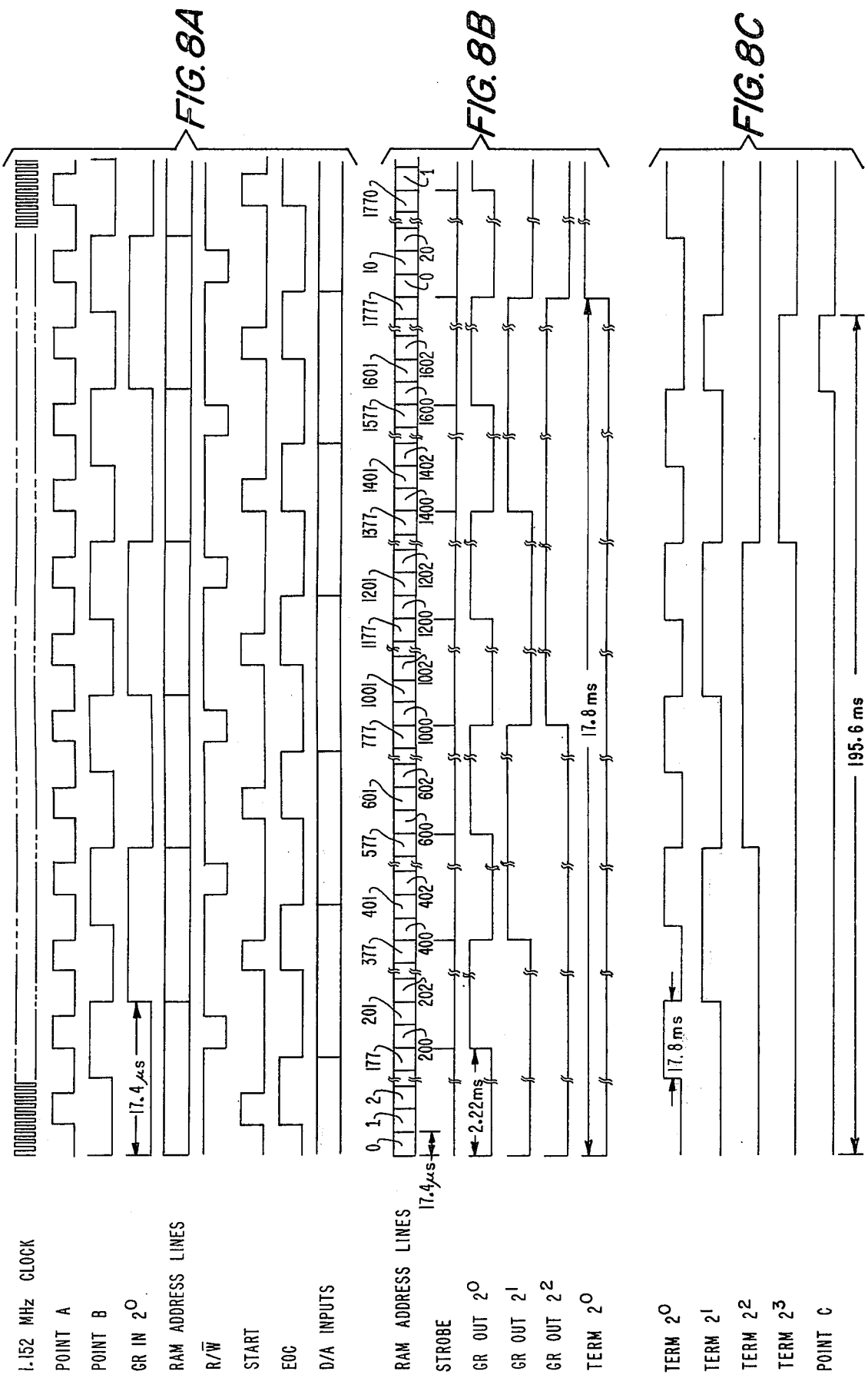
FIGS. 8A, 8B, and 8C are timing diagrams of signals generated within the scanner for controlling its operation.

Outputs from the third count-to-16 counter 54 produce GR OUT $2^0$, GR OUT $2^1$, and GR OUT $2^2$ signals. These signals identify the originating group address associated with the data being presented at the outputs 101–105 (FIG. 1). The STROBE signal is produced from the second count-to-16 counter 53. The third count-to-16 counter 54 also generates FF CLR signals to the memory address control logic. As shown in FIG. 8B these signals establish a 2.22 millisecond period which is the period for reading out a set of data associated with a single group, or a group readout period.

Outputs from the count-to-11 counter 55 provide TERM $2^0$, TERM $2^1$, TERM $2^2$, and TERM $2^3$ signals shown in FIG. 8C. These signals identify the terminal address, within the originating group associated with the data being presented at the outputs 101–105 (FIG. 1). In addition, these signals together with a $\overline{\text{TERM } 2^3}$ signal are applied to the input multiplexerx 1–8. These signals establish a line or terminal sampling period of 17.8 milliseconds. Since the 11 terminals of each group are sampled sequentially by terminals and in parallel by groups, the total system scanning period is 195.6 milliseconds.

The timing section also includes a count-to-10 counter 57 which is coupled to the outputs from the third count-to-16 counter 54. The count labelled TERM SHIFT is taken from the stages of the count-to-10 counter 57 and applied to the memory address control logic. The count of the TERM SHIFT signal changes every 17.8 millisecond period; that is, at the same rate as the TERM CODE signals. However, the TERM SHIFT signals count through a recurring sequence of 10.

Sampling and Digitizing

Figure 3:
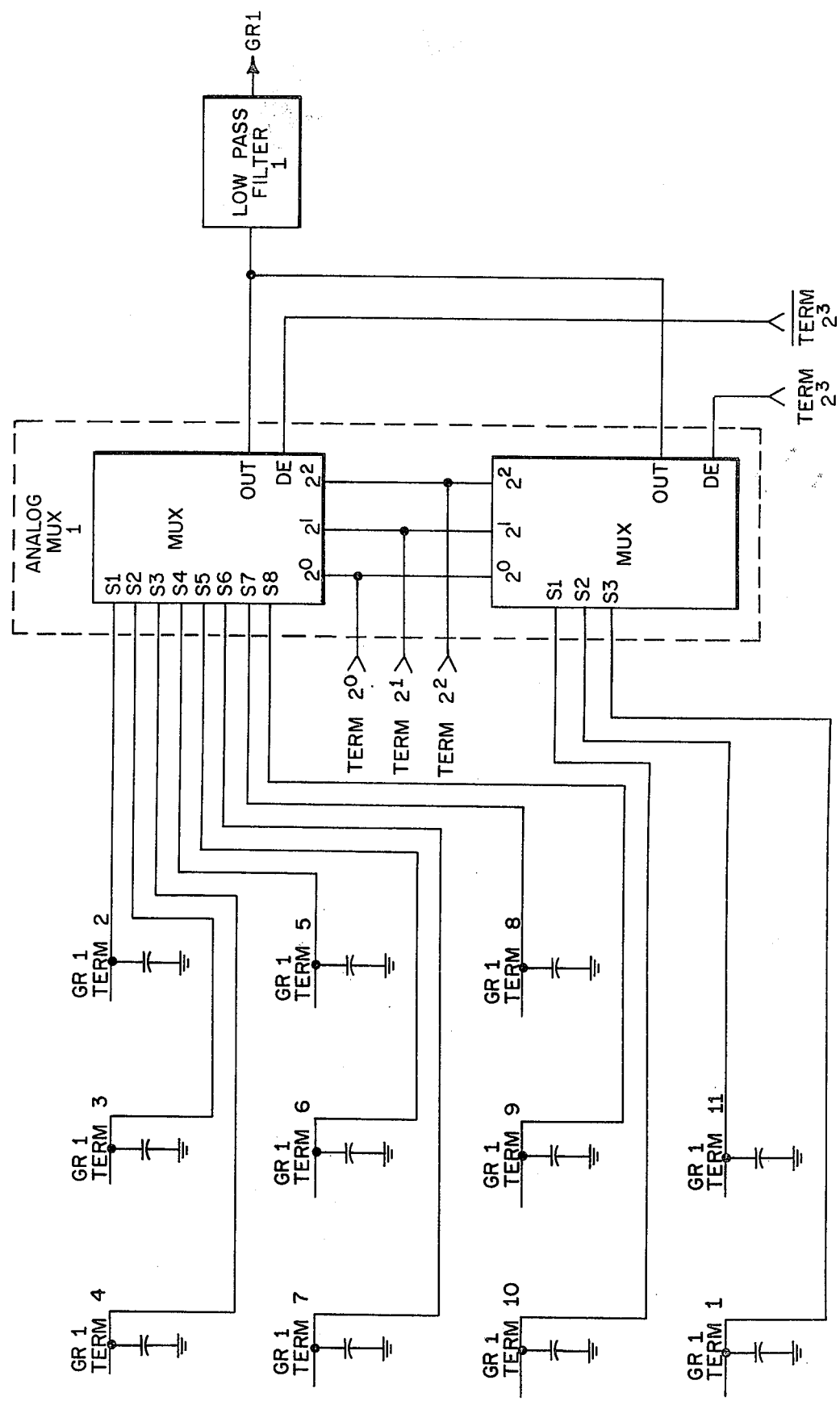
FIG. 3 is a diagram of one portion of the input section of the scanner.

FIG. 3 illustrates the portion of the input section for handling the first group of 11 incoming lines. Similar portions of the input section handle the other seven groups of incoming lines. The 11 lines of the group are connected to the 11 terminals of the analog multiplexer 1, shown in the figure as being two identical components combined to provide and 11-input multiplexer. Control signals TERM $2^0$, TERM $2^1$, TERM $2^2$, TERM $2^3$, and $\overline{\text{TERM } 2^3}$ from the timing section are applied to the multiplexer and to the other seven input multiplexers in parallel.

As shown in FIG. 3 the connections of the GR1 TERM 1 – GR1 TERM 11 input terminals to the multiplexer inputs are offset by one. As will be explained in detail hereinbelow, data associated with one terminal of each group is presented at the output terminals 101–105 during the same terminal sampling period that data associated with the next terminal of each group is being sampled by the input multiplexers. Thus, the same TERM CODE signals (FIG. 8C) may be used to identify the input terminal the output data is associated with in usual binary notation and also may be used directly to control the input multiplexer without modification.

The TERM CODE signals shown in FIG. 8C cause the multiplexer to step from one terminal to the next every 17.8 milliseconds. If during this dwell period the terminal being sampled is signaling for service, one of the four high band tones 1,209 Hz, 1,477 Hz, 2,250 Hz, or 2,600 Hz either singly or in combination with the low band tone 941 Hz are present at the terminal. The 17.8 millisecond dwell period is sufficiently long to permit several cycles of any one of the tones to be present in the sampled portion of the input signal which appears at the output of the multiplexer.

The 17.8 millisecond period sample of the tones present on a terminal of the group is applied to the low pass filter 1. The low pass filter 1 may be any of various types of well-known filters either active or passive. Preferably, in order to save weight and space an active filter may be employed. The low pass filter 1 reduces high frequency noise which might combine with the 7.2 KHz sampling rate at which the eight-input multiplexer 15 operates to produce frequencies at the same frequency as a supervisory tone.

Figure 4:
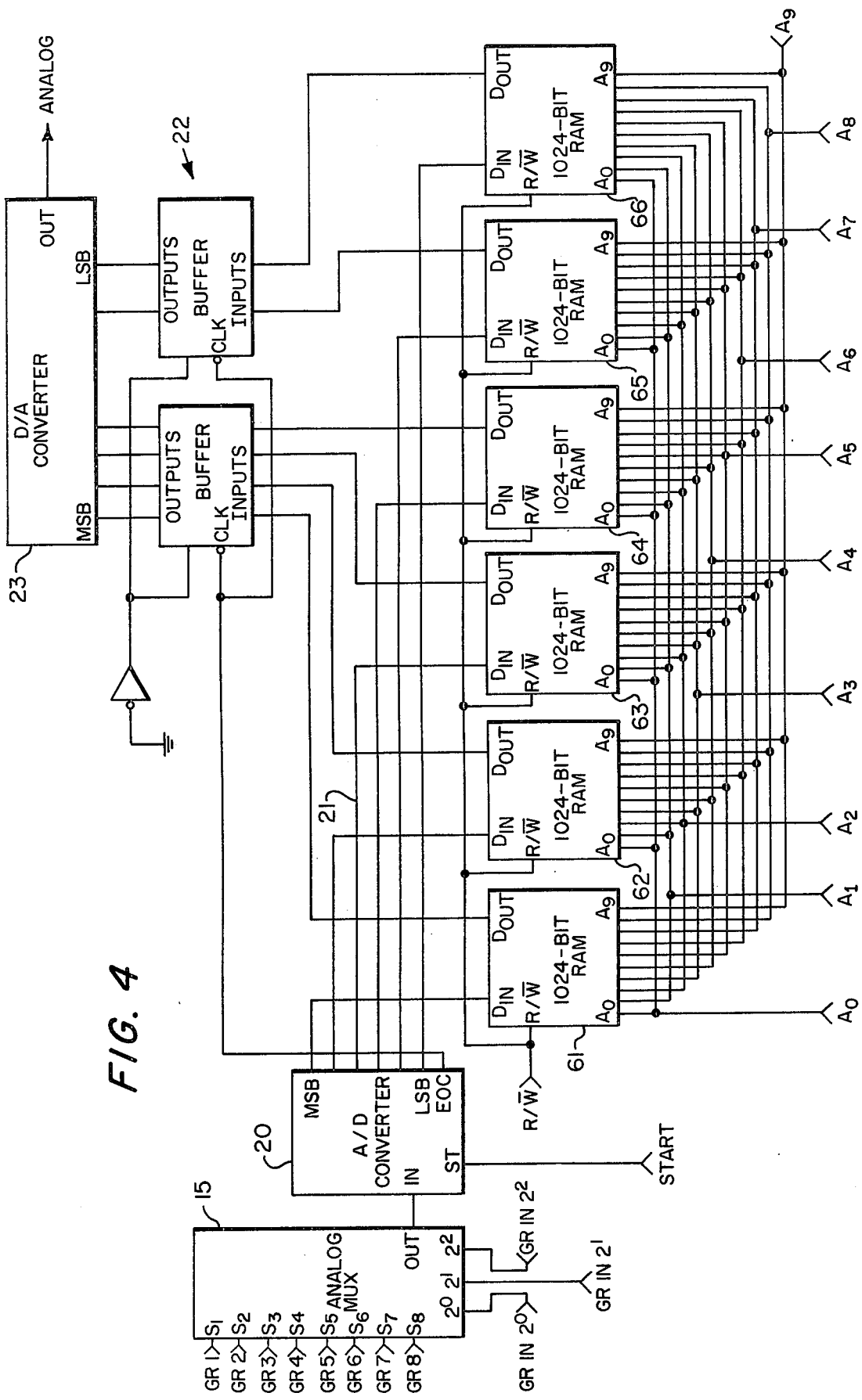
FIG. 4 is a logic diagram of a section of the scanner including a multiplexer, an analog-to-digital converter, a memory, and a digital-to-analog converter.

The sampled portions of the tones from the low pass filters 1–8 are applied as signals GR 1–8 to the eight-input multiplexer 15 as shown in FIG. 4. The multiplexer 15 is stepped through its eight input terminals by signals GR IN $2^0$, GR IN $2^1$, and GR IN $2^2$ from the timing section. (Only the GR IN $2^0$ signal is shown in FIG. 8A). An analog sample is thus taken every 17.4 microseconds, and the signal from each group is sampled every 139 microseconds. Thus, during a 17.8 millisecond terminal sampling period 128 analog samples are taken of each of the signals GR 1 – GR8.

Every 17.4 microsecond period the multiplexer 15 applies an analog sample to the analog-to-digital converter 20. The analog-to-digital converter 20 is activated by a START signal from the timing section which, as shown in FIG. 8A, occurs a slight delay after the start of each 17.4 microsecond data sampling period. The analog-to-digital converter 20 converts each analog sample to a digital sample of 6 bits. The 6 bits are presented in parallel at its outputs. The analog-to-digital converter 20 also produces a EOC signal as shown in FIG. 8A.

Memory and Memory Address Control

The memory 21 as shown in FIG. 4 employs a set of six random access memories (RAMS) 61–66 for storing the 6 bits of each digital sample received from the analog-to-digital converter 20. The RAMS receive and read out the 6 bits of each sample in parallel and each receives identical control signals. Each RAM has storage locations for 1024 bits. Thus, the capacity of the entire memory 21 is 1024 6-bit digital samples, the number of samples produced during each 17.8 millisecond terminal sampling period. For purposes of discussion herein, each RAM is considered organized in an 8 × 128 storage location arrangement, and the addresses to the storage locations are expressed in octal base numbers.

The RAMS are controlled to write in or read out data by the R/$\overline{\text{W}}$ signal from the timing section (FIG. 2). The R/$\overline{\text{W}}$ signal as shown in FIG. 8A is repeated every 17.4 microsecond period with the "read" instruction preceding the "write" instruction. The addresses to individual storage locations of each of the RAMS is controlled by the ADDRESS signals $A_0 - A_9$. As shown in FIG. 8A the RAM addresses also change each 17.4 microsecond period.

Figure 5:
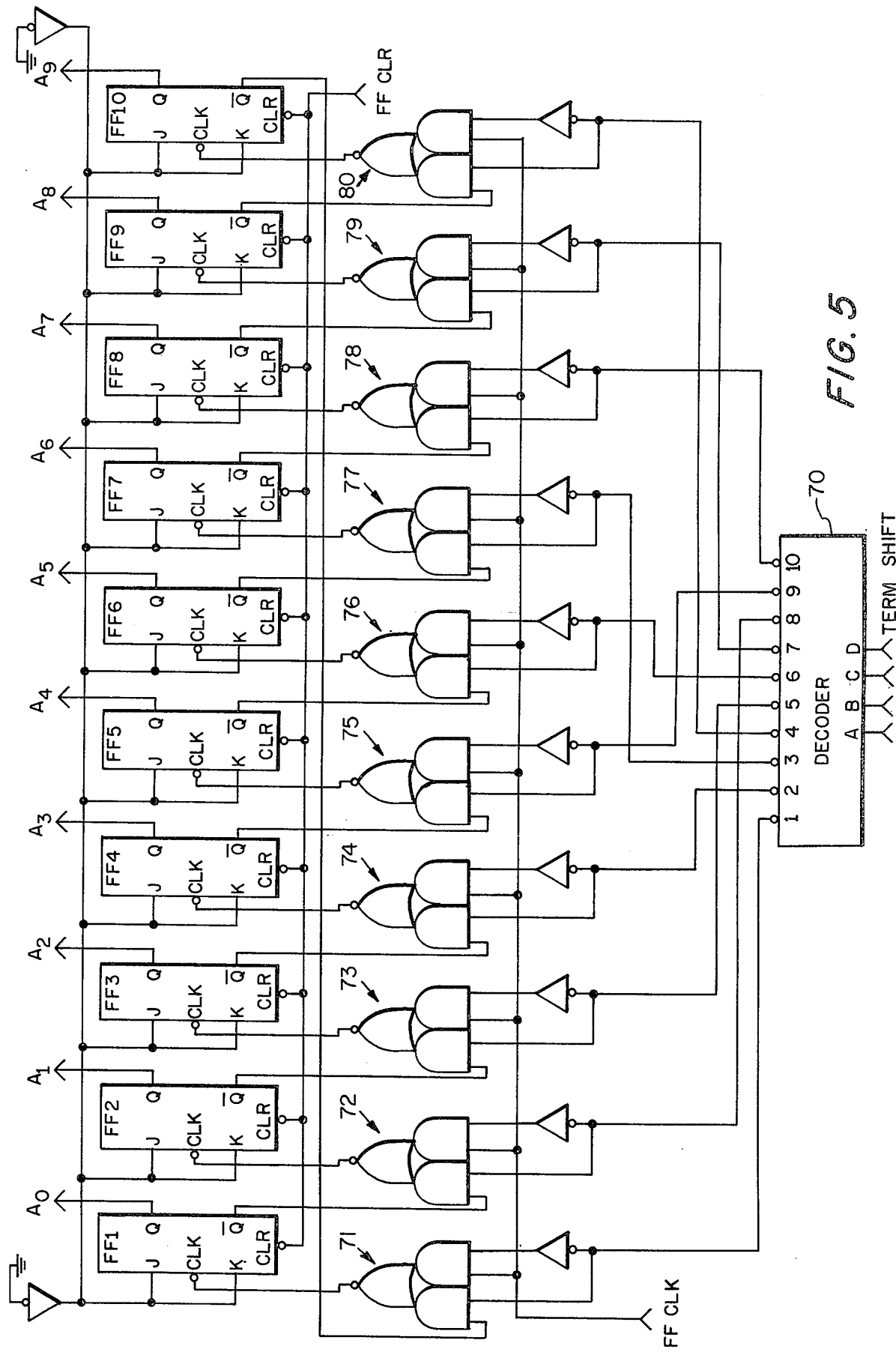
FIG. 5 is a logic diagram of the memory address control section of the scanner.

The RAM ADDRESS signals $A_0 - A_9$ are controlled by the memory address control logic which is illustrated in FIG. 5. The memory address control logic includes a set of 10 flip-flops FF1 – FF10. The Q outputs of the flip-flops FF1 – FF10 provide the signals $A_0 - A_9$, respectively. The clock inputs to the flip-flops FF1 – FF10 are controlled through gating arrangements 71–80, respectively. The FF CLK signal, which is an inversion of the signal at point B of the timing section (FIG. 2) and is shown in FIG. 8A, is applied to all of the gating arrangements. The FF CLK pulses pass through only one of the gating arrangements to its associated flip-flop as determined by control signals from a decoder 70. In addition, the clock input of each flip-flop is coupled to the $\overline{\text{Q}}$ output of the preceding flip-flop through its gating arrangement.

The decoder 70 decodes the count of the count-to-10 counter 57 of the timing section (FIG. 2) as indicated by the TERM SHIFT signals. The decoder 70 thus produces an output signal at one of its outputs 1–10, and the output signal shifts from one output to the next every 17.8 milliseconds in a recurring sequence. An FF CLR pulse is generated in the timing section (FIG. 2) at the end of each 17.8 millisecond terminal sampling period to clear all the flip-flops.

The sequence in which data must be written into and read out of the memory is indicated by the table of FIG. 9. As shown by the column labelled "Sampling and Writing Sequence" samples for the first terminals of each of the eight groups are obtained by sampling each of the eight groups in order repeatedly until 128 samples are obtained for each group. As shown by the column labelled "Reading Sequence," the order or reading out the data is different. The 128 samples of group 1 data are read out first, followed by the 128 samples of group 2 data, and so on in order by groups. To permit this sequence of operations all of the terminal 1 data is written into the memory during one terminal sampling period while terminal 2 data is being collected.

The data could be handled in the foregoing manner by employing two memories which operate in alternation to store and read out data during subsequent terminal sampling periods. However, the memory and memory address control logic as described herein permits the use of a single memory having the capacity for storing data pertaining to only a single terminal. As each stored sample is read out of the memory it is immediately replaced with another sample. Therefore, the storage locations of the memory must be addressed in a different order during each terminal sampling period.

Figure 10A:
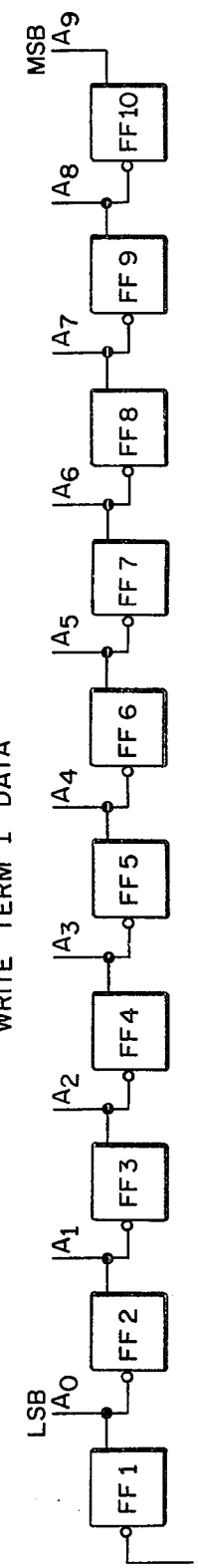
FIGS. 10A, 10B, and 10C are simplified representations of a portion of the memory address control logic which are useful in explaining the sequence of operations of the scanner.
Figure 10B:
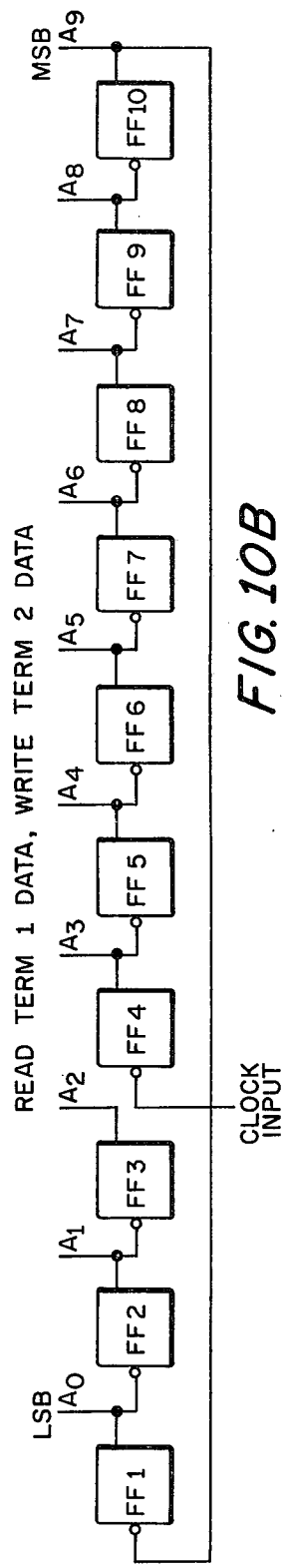
Figure 10C:
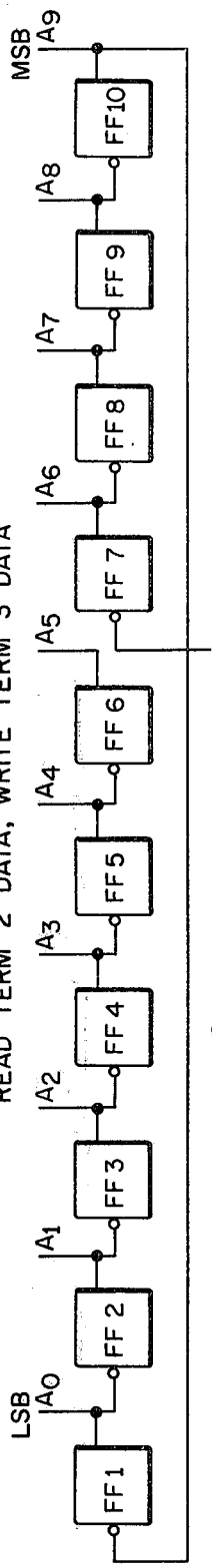

The sequence of addressing the RAMS so as to properly write in and read out data may best be understood from the table of FIG. 9 and the schematic representations of the flip-flops FF1 – FF10 in FIGS. 10A, 10B and 10C together with FIGS. 4 and 5 and the timing diagrams of FIGS. 8A, 8B, and 8C. It is assumed for purposes of discussion that the first terminals of the groups are being sampled during a terminal sampling period while the TERM SHIFT signal is causing the decoder 70 to produce a signal on its 1 output. Under these conditions only the gating arrangement 71 of the 10 gating arrangements 71–80 is activated to permit FF CLK pulses to pass through and be applied to the clock input of its associated flip-flop FF1. In effect, the flip-flops become interconnected in the manner shown in FIG. 10A.

With the flip-flops associated as shown in FIG. 10A, the address outputs $A_0$ – $A_9$ count in order addressing every one of the 1024 storage locations in each of the RAMS in order as indicated by the RAM ADDRESS of the Sampling and Writing Sequence in FIG. 9. As shown in FIGS. 8A and 8B each RAM ADDRESS occurs over a 17.4 microsecond period. During each 17.4 microsecond period, the R/W signal (FIG. 8A) causes the digital sample stored at the address to be read out during the first portion of the data sampling period, and causes the digital sample from the analog-to-digital converter 20 to be written in at the same address during the last portion of the data sampling period.

During each group scanning period of 139 microseconds, a sample is taken from the first terminal of each group and stored in the memory. Upon completion of a 17.8 millisecond terminal sampling period, each group has been sampled 128 times and a total of 1024 digital samples are stored in the RAMS at the addresses as indicated in FIG. 9.

After the data associated with the first terminal of each of the groups has been written in the memory during the first terminal sampling period, the data must be read out in the order as indicated in the column "Reading Sequence" of FIG. 9 during the second terminal sampling period. To read out the samples for a group every eighth storage location of the RAMS must be addressed in sequence as shown in the RAM ADDRESS for the Reading Sequence in FIG. 9. During the second terminal sampling period, the TERM SHIFT signal from the count-to-10 counter 57 of the timing section (FIG. 2) changes and the output signal from the decoder 70 (FIG. 5) shifts from its 1 output to its 2 output. This signal activates the gating arrangement 74 associated with the fourth flip-flop FF4. Thus, the FF CLK pulses are routed to that flip-flop as illustrated in the schematic representation of FIG. 10B.

Under these conditions the count on the ADDRESS lines $A_0$ – $A_9$ steps by eight for each clock pulse, and every eighth storage location in the RAMS is read out in sequence until all the samples for a group have been read out. Thus, as shown in the Reading Sequence of FIG. 9 the RAMS are properly addressed to read out the data from all of the 1024 storage locations in the proper order. At the same time, as shown by the "Sampling and Writing Sequence" and associated RAM ADDRESS of FIG. 9, the terminal 2 data is being written into the memory at the same addresses.

Upon completion of the second 17.8 millisecond terminal sampling period all of the terminal 1 data has been read out of the memory and processed as will be explained hereinbelow and has been replaced by terminal 2 data. During the third terminal sampling period when the terminal 2 data is read out of the memory and terminal 3 data is written in as shown in FIG. 9, the decoder 70 produces a signal at its 3 output. This signal activates the gating arrangement 77 associated with the seventh flip-flop FF7 and the FF CLK pulses are directed to its clock input as shown in FIG. 10C. Thus, during the third terminal sampling period every 64th storage location in the RAMS is addressed in sequence until all the samples for a group have been read out causing the terminal 2 data to be read out in the proper order as shown in FIG. 9.

Processing of data into and out of the memory continues in this manner with the FF CLK pulses being stepped by three flip-flops during subsequent terminal sampling periods in a recurring sequence. Since, in this particular embodiment, 11 terminal sampling periods are required to scan the complete system and there are only 10 address lines and flip-flops, the system scanning cycle and memory addressing cycles overlap. Thus, on the next system scanning cycle while the previously stored terminal 11 data is being read out and terminal 1 data is being written, the FF CLK pulses are directed to the fourth flip-flop FF4 and in FIG. 10B. However, although the cycles are out of phase they are independent and data will be properly stored and read out for each terminal sampling period of each system scanning period.

Digital-to-Analog Conversion and Analog Processing

During each 17.4 microsecond period the 6 bits of a digital sample are read out in parallel from the memory 21 and placed in a buffer 22 (FIG. 4). The data is clocked into the buffer by an EOC signal from the analog-to-digital converter 20. As shown in FIG. 8A the EOC signal occurs during the "read" portion of each R/W signal.

The outputs of the buffer 22 are connected to a digital-to-analog converter 23 which converts the 6 bits of each digital sample to an analog voltage. During a group readout period of 2.22 milliseconds the 128 samples associated with a single group appear as a series of 128 analog voltage pulses at the output of the digital-to-analog converter 23. These 128 pulses are produced from samples which were obtained by the eight-input multiplexer 15 over a period of 17.8 milliseconds. Thus, the pulses in the ANALOG signal from the digital-to-analog counter 23 have been speeded up, or time compressed, by a factor of 8.

Figure 6:
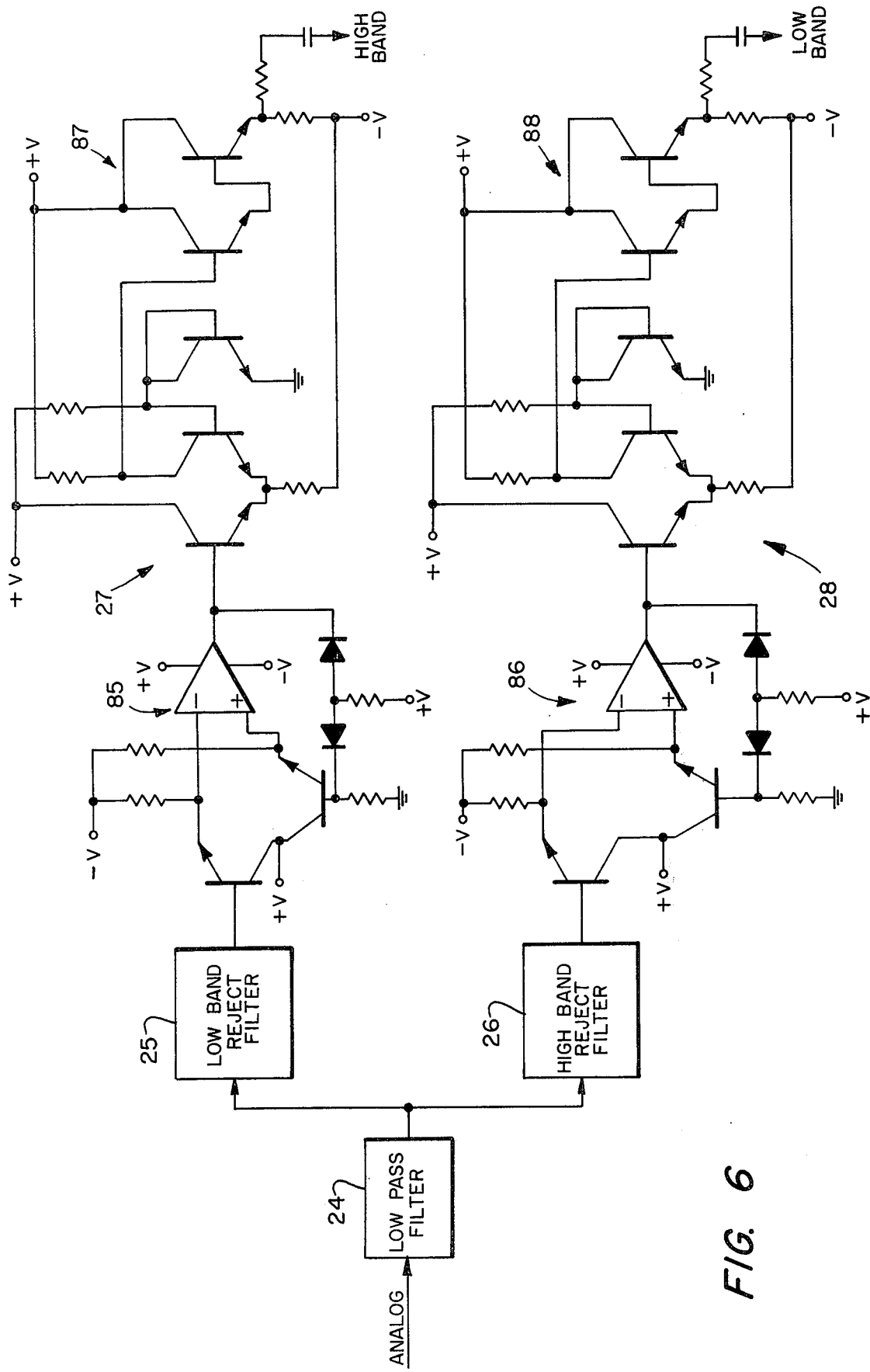
FIGS. 6 and 7 are diagrams of the filtering and detection sections of the scanner.

The voltage pulses of the ANALOG signal are applied to a low pass filter 24 as illustrated in FIG. 6. The low pass filter 24 eliminates the steps between pulses of the ANALOG signal and also reduces sum and difference frequencies generated during the sampling procedures. Thus, during each 2.22 millisecond group readout period the output of the low pass filter 24 is a smooth, continuous curve of signal frequencies eight times the frequencies present in the input signal from which it was derived.

The output signals of the low pass filter 24 are applied to a low band reject filter 25 and a high band reject filter 26 in parallel. As mentioned previously, in the system under discussion supervisory tones of 1,209 Hz, 1,477 Hz, 2,250 Hz, and 2,600 Hz are designated high band and a tone of 941 Hz is designated low band. Also, as explained previously, an incoming signal may consist of a single high band tone by itself or a high band tone together with the low band tone. Since the incoming frequencies have been multiplied by a factor of eight, the low band reject filter 25 rejects frequencies of 7,528 Hz (941 × 8) and below. The high band reject filter 26 rejects the frequencies of 9,672 Hz (1,209 × 8), 11,816 (1,477 × 8), 18,000 Hz (2,250 × 8), and 20,800Hz (2,600 × 8).

The signals passing through the band reject filters 25 and 26 are applied to comparators 85 and 86 of the comparator and limiter arrangements 27 and 28, respectively. The comparators 85 and 86 pass only signals from the band reject filters which exceed a predetermined threshold level. Thus, the incoming signals must be of greater amplitude than a certain minimum level in order to be acceptable. The limiters 87 and 88 are differential amplifier circuits which amplify the outputs of the comparators 85 and 86, respectively, to produce square waves having a fixed peak-to-peak level.

Figure 7:
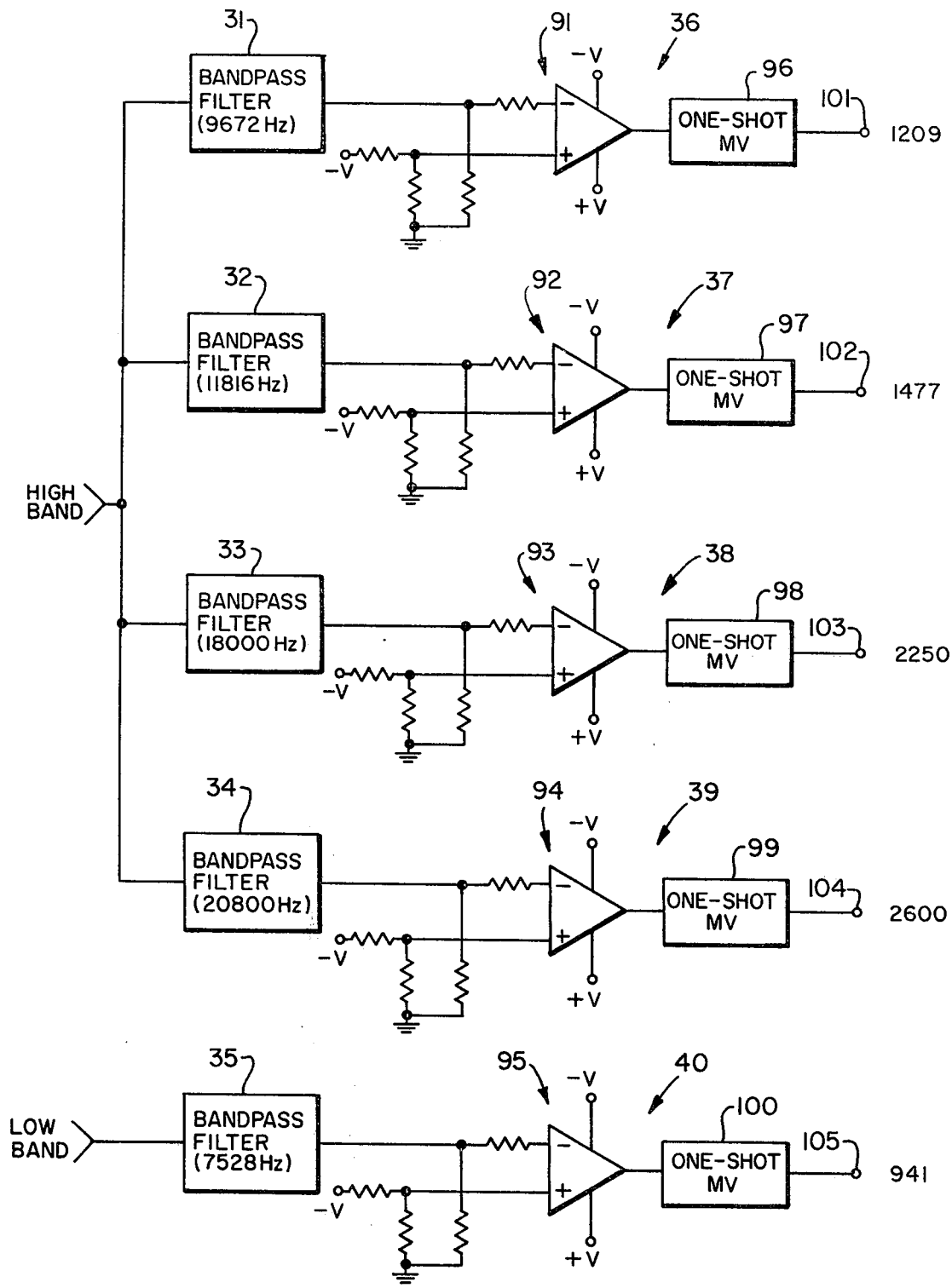

The HIGH BAND and LOW BAND signals from the limiters 87 and 88 are applied to tone filters as shown in FIG. 7. The LOW BAND signal is applied to a bandpass filter 35 which passes a frequency of 7,528 Hz. The HIGH BAND signal is applied in parallel to bandpass filters 31, 32, 33, and 34 which pass frequencies of 9,672Hz, 11,816 Hz, 18,000 Hz, and 20,800 Hz, respectively. The outputs of the bandpass filters 31, 32, 33, 34, and 35 are applied to associated comparator circuits 91, 92, 93, 94, and 95, respectively. The comparator circuits respond only to signals above a certain predetermined threshold level. Thus, each comparator circuit further insures that the amplitude of the associated tone in the incoming signal is of sufficient magnitude to be a proper signal.

The outputs of the comparators 91, 92, 93, 94 and 95 are applied to associated one-shot multivibrators 96, 97, 98, 99 and 100 as shown in FIG. 7. The one-shot multivibrators have a timing cycle of approximately 330 microseconds, and thus output pulses from a comparator continually retrigger its associated multivibrator to hold it ON. While a multivibrator 96, 97, 98, 99, and 100 is ON, it produces a relatively high level signal at its output terminal 101, 102, 103, 104, and 105, respectively, indicating the presence of the associated supervisory tone in its associated incoming signal.

The indicating signal appears at the output of a multivibrator during a group readout period of 2.22 milliseconds (plus the 330 microsecond operating period of the multivibrator) while the data is being read out of the memory. During the 2.22 millisecond period that an indicating signal is present, group output signals GR OUT $2^0$, GR OUT $2^1$, and GR OUT $2^2$ (shown in FIG. 8B) identifying the particular group are produced by the timing section. The TERM $2^0$, TERM $2^1$, TERM $2^2$, and TERM $2^3$ signals from the timing section identify the particular terminal within the group. As mentioned previously, the same TERM CODE signals are employed both to control the input analog multiplexers 1–8, 10 and to identify the terminal associated with the signals on the output terminals. Since the output signals occur during the terminal sampling period after the incoming signal they are associated with, the connections of the TERM 1 – TERM 11 input terminals of each group to the multiplexer inputs are offset by one (FIG. 3). Thus, when the TERM CODE signals indicate a particular terminal, the terminal being sampled is the next terminal in order.

As shown in FIG. 8B a STROBE pulse is produced by the timing section near the end of each 2.22 millisecond group readout period. This pulse may be employed to strobe succeeding equipment to accept the output signals, if any, from the multivibrators together with the TERM CODE and GROUP OUTPUT CODE. The identification of the line and the supervisory tones present thereon may then be used in the usual well-known manner for providing service to the incoming line.

Thus, in summary, the scanner as described herein continuously monitors 88 incoming lines by sampling eight groups of 11 lines in parallel. Analog signals present on a line are sampled, converted to digital samples, and the digital samples are stored in a memory. The data is read out from the memory at eight times the speed it was collected, and is converted to an analog signal with frequencies 8 times the tone frequencies from which it was derived. The analog signal is processed in a manner which is standard for processing supervisory tones, except that the frequencies are greater by a factor of 8. The output information on the presence or absence of each of the supervisory tones is presented in binary form in the usual well-known manner. Line address information pertaining to the supervisory tone indications is presented simultaneously with the tone indications for processing by other equipment of the exchange in accordance with standard techniques.

The scanner as described provides for a reduction in the filters and other analog signal processing circuitry to one-eighth of that previously required. These elements are responsible for most of the weight and volume of a scanner. The additional circuitry required, although complex, is digital logic circuitry and is readily available as standard integrated circuit components of very samll size. Thus, a substantial saving in volume and weight is obtained.

While there has been shown and described what is considered a preferred embodiment of the present invention it will be obvious to those skilled in the art that various changes and modifications may be made therein without departing from the invention as defined by the appended claims.

What is claimed is:

1. Scanning apparatus for detecting the presence of signals of predetermined frequencies on any of a plurality of lines, the plurality of lines being arranged in a number of groups with a number of lines in each group, said apparatus including in combination
   first multiplexing means for repeatedly sampling the lines of each group, a corresponding one of the lines in each group being sampled simultaneously during a line sampling period;
   said first multiplexing means having a number of output connections equal to the number of groups and each output connection having present thereon during a line sampling period a sampled portion of the input signal from a different one of said groups;
   second multiplexing means coupled to the output connections of the first multiplexing means for repeatedly sampling said output connections in sequence during each line sampling period, and for producing at its output connection a multiplicity of analog samples of each of said sampled portions;
   analog-to-digital converting means coupled to the output connection of the second multiplexing means for converting in sequence each of said analog samples to a digital sample;
   memory means coupled to said analog-to-digital converting means for storing said digital samples;
   memory readout means for reading out of the memory means the digital samples associated with each of the groups of lines, all of the samples associated with a group being read out for each group in turn, the multiplicity of digital samples associated with a group being read out in the same sequence as the analog samples associated with that group were produced by the second multiplexing means;
   digital-to-analog converting means coupled to the memory means for converting each of said digital samples to an analog pulse;
   filter means coupled to the digital-to-analog converting means for converting the multiplicity of analog pulses associated with a group of lines to an analog signal, the signal frequencies present in an analog signal being equal to the predetermined frequencies present in the associated sampled portion of the input signal times the number of groups;
   detecting means coupled to the filter means for determining the presence or absence of each of the signal frequencies in the analog signal and for producing indications thereof which indicate the presence or absence of each of the predetermined frequencies in the associated sampled portion of the input signal; and
   line address means for producing line identifying signals designating the particular group and particular line of the group with which said indications are associated.

2. Scanning apparatus in accordance with claim 1 wherein
   said memory readout means is operable to read out from the memory means during a line sampling period the digital samples written into the memory means during the immediately preceding line sampling period, the multiplicity of digital samples associated with a group being read out during a group readout period, a line sampling period being equal to a group readout period times the number of groups;
   said filter means is operable to convert the multiplicity of analog pulses associated with a group of lines to an analog signal during a group readout period;
   said detecting means is operable to produce indications indicating the presence or absence of each of the predetermined frequencies in the associated sampled portion of the input signal during a group readout period; and
   said line address means is operable to produce line identifying signals designating the particular group and line of the group with which said indications are associated during the group readout period while said indications are being produced.

3. Scanning apparatus in accordance with claim 2 wherein said detecting means includes
   a plurality of bandpass filter means, the plurality being equal to the number of predetermined frequencies, each bandpass filter means being capable of passing a signal frequency equal to a different one of the predetermined frequencies times the number of groups; and
   a plurality of indicating means, each being coupled to a corresponding one of said bandpass filter means and being operable to produce a first signal condition at its output in response to the presence of a signal frequency passed by the corresponding bandpass filter means and to produce a second signal condition at its output in response to the absence of a signal frequency from the corresponding bandpass filter means.

4. Scanning apparatus in accordance with claim 3 wherein said detecting means includes
   a plurality of threshold means, each being connected between one of said bandpass filter means and the corresponding indicating means, said threshold means being operable to pass a signal frequency having an amplitude greater than a predetermined amplitude and to block a signal frequency having an amplitude less than the predetermined amplitude.

5. Scanning apparatus in accordance with claim 2 wherein
   said second multiplexing means is operable to sample an output connection of the first multiplexing means and produce an analog sample during a data sampling period;
   said analog-to-digital converting means is operable to convert the analog sample produced during a data sampling period to a digital sample during the same daa sampling period;
   and including
   memory input control means for writing a digital sample into the memory means during the same data sampling period it was produced;

a multiplicity of digital samples for each group of the number of groups being written into the memory means during a line sampling period, a line sampling period being equal to the data sampling period times the number of samples in a multiplicity times the number of groups; and said memory readout means being operable to read out a digital sample during each data sampling period, a group readout period during which the multiplicity of digital samples associated with a single group are read out being equal to the data sampling period times the number of samples in a multiplicity of samples.

6. Scanning apparatus in accordance with claim 5 including timing means operable to cause said first multiplexing means to sample a corresponding one of the lines of each of the groups of lines during a line sampling period and to sample all the lines of each group during a system scanning period, a system scanning period being equal to a line sampling period times the number of lines in each of the groups;

said timing means including means operable to cause said second multiplexing means to sample an output connection of the first multiplexing means during a data sampling period and to sample all the output connections of the first multiplexing means during a group scanning period, a group scanning period being equal to a data sampling period times the number of groups, a multiplicity of samples of each group being produced during a line sampling period;

said timing means including means operable to cause said memory input control means to write a digital sample into the memory means during each data sampling period, and to cause said memory readout means to read out a digital sample during each data sampling period; and said timing means including said line address means and being operable to produce a different combination of first signals during each line sampling period of a system scanning period to designate the one line of each group associated with the digital samples being read out of the memory means during the line sampling period, and to produce a different combination of second signals during each group readout period of a line sampling period to designate the particular one of the number of groups associated with the digital samples being read out of the memory means during the group readout period.

7. Scanning apparatus in accordance with claim 6 wherein said memory means includes a plurality of sets of storage locations, each set of storage locations being capable of storing a digital sample, the plurality of sets of storage locations being equal to the number of digital samples produced during a line sampling period;

and including buffer means connected between said memory means and said digital-to-analog converting means for storing a digital sample;

said timing means being operable to cause said memory readout means to read a digital sample out of a set of storage locations and enter said digital sample in the buffer means during the first portion of each data sampling period; and said timing means being operable to cause said memory input control means to write the digital sample being produced by the analog-to-digital converting means into the memory means during the second portion of the data sampling period, the digital sample being written into the same set of storage locations from which a digital sample was read out during the first portion of the same data sampling period.

8. Scanning apparatus in accordance with claim 7 including memory address control means coupled to said sets of storage locations and operable to address a different one of said sets of storage locations during each data sampling period of a line sampling period whereby digital samples are read out of and written into each of said sets of storage locations during a line sampling period; and said memory address control means being operable to address the sets of storage locations in different order during successive line sampling periods so as to address the sets of storage locations containing the multiplicity of digital samples associated with a single group in order during each group readout period.

9. Scanning apparatus in accordance with claim 8 wherein said detecting means includes a plurality of bandpass filter means, the plurality being equal to the number of predetermined frequencies, each bandpass filter means being capable of passing a signal frequency equal to a different one of the predetermined frequencies times the number of groups; and a plurality of indicating means, each being coupled to a corresponding one of said bandpass filter means and being operable to produce a first signal condition at its output in response to the presence of a signal frequency passed by the corresponding bandpass filter means and to produce a second signal condition at its output in response to the absence of a signal frequency from the corresponding bandpass filter means.

10. Scanning apparatus in accordance with claim 9 wherein said detecting means includes a plurality of threshold means, each being connected between one of said bandpass filter means and the corresponding indicating means, said threshold means being operable to pass a signal frequency having an amplitude greater than a predetermined amplitude and to block a signal frequency having an amplitude less than the predetermined amplitude.

* * * * *